Oct. 24, 1950 W. THOMAS 2,526,711
LANDING GEAR FOR AIRPLANES
Filed Nov. 29, 1945 2 Sheets-Sheet 1
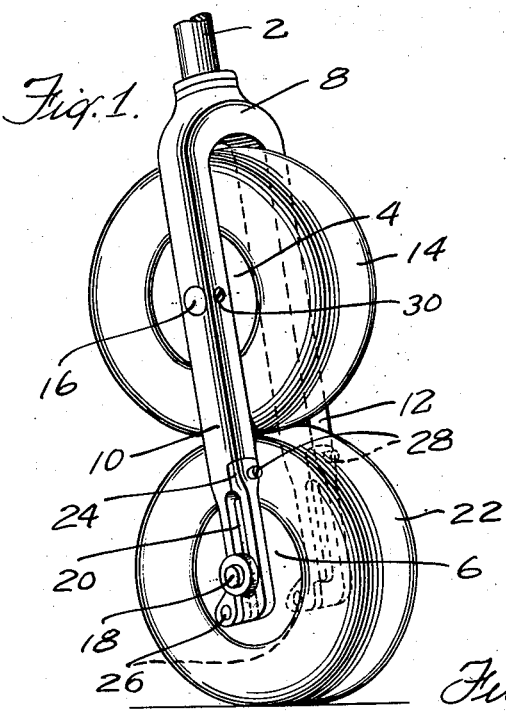
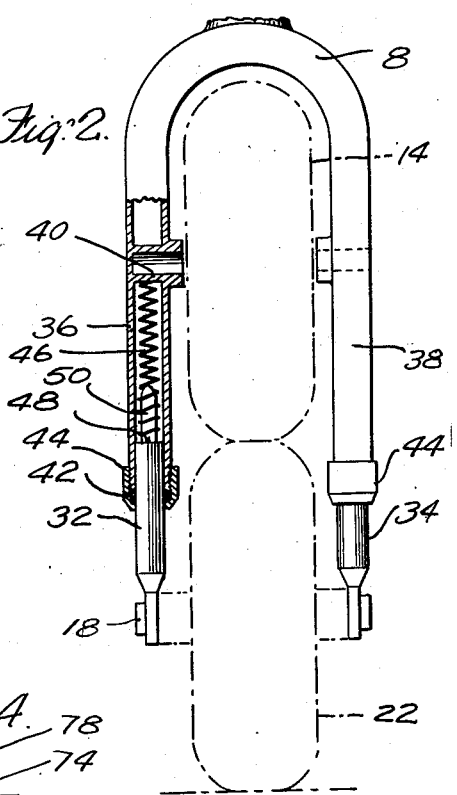
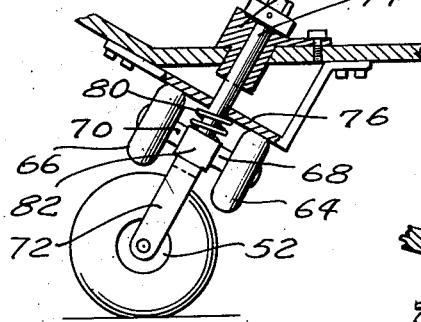
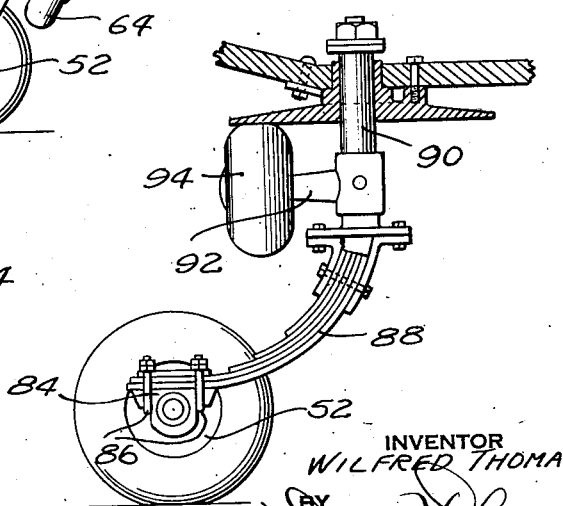
INVENTOR
WILFRED THOMAS
BY
ATTORNEY Oct. 24, 1950 — W. THOMAS — 2,526,711
LANDING GEAR FOR AIRPLANES
Filed Nov. 29, 1945 — 2 Sheets-Sheet 2
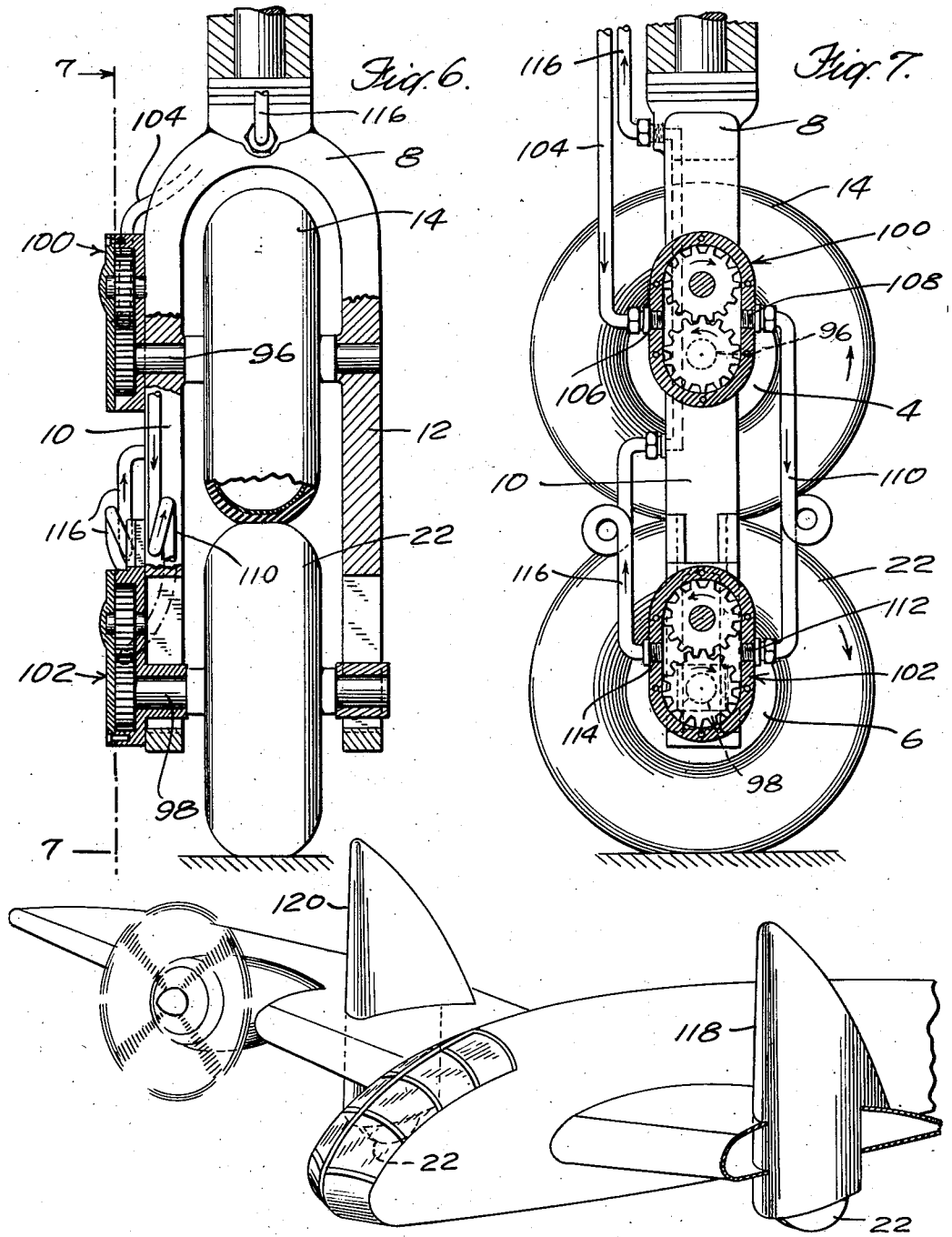

Patented Oct. 24, 1950

2,526,711

UNITED STATES PATENT OFFICE 2,526,711

LANDING GEAR FOR AIRPLANES

Wilfred Thomas, Albany, N. Y.

Application November 29, 1945, Serial No. 631,554

5 Claims. (Cl. 244—103)

This invention relates to landing gear for airplanes and has for its general object to improve the shock-absorbing characteristics of landing gear and so to distribute the stresses incident to landing as to reduce local wear and avoid undue strain upon any part of the landing gear.

In the ordinary landing gears of airplanes, and particularly in the retractable landing gears of the heavier planes, the main shock of landing is taken up by deformation of the large, heavy duty pneumatic tires on the main wheels of the landing gear. Auxiliary shock absorbing means are also sometimes provided for taking up a part of the endwise thrust on the landing wheel supports.

It is obvious that if the main reliance for shock absorbing be upon the pneumatic tires of the main landing wheels considerable deformation of these tires will take place when the initial contact with the ground is made and thus considerable eccentricity of the ground contact surface will be produced. This is not entirely objectionable if the two main wheels strike the ground simultaneously, as in a perfect three point landing, but too much eccentricity of one of the tires, when the contact is uneven, tends to put needless strains both upon the landing gear mechanism itself and upon its connections to the plane fuselage.

An object of the present invention is to avoid putting directly upon the ground contacting wheels themselves too much of the burden of taking up landing stress and thus to avoid compressive stresses upon the main wheel tires so great as to produce excessive eccentricity of these wheels. To this end the invention contemplates the arrangement of a pneumatic-tired wheel above each ground-engaging wheel of the main landing gear and in such manner that a part of the compressive stress will be taken up by the pneumatic tire of the upper wheel and thus relieve the excessive stress that would otherwise cause marked eccentricity of the ground-engaging wheel.

Although the invention is particularly directed to the solution of the problem of so distributing the stresses incident to landing as to avoid undue strain upon any part of the landing gear and has its principal utility in its application to the main wheels of the landing gear and their supports, it has almost equal utility in its application to the tail wheel. In applying the invention to the tail wheel, which is usually mounted on a swiveled support in such manner that the wheel casters, the means for distributing the stresses incident to landing and for avoiding excessive compression of the usual pneumatic tire of the tail wheel are preferably so arranged that they cooperate with the swivel part of the tail wheel support, which is preferably constructed to operate also as the thrust stem part of said support.

An important feature of the invention, when applied to the tail wheel, is the provision of a pneumatic tire or tires upon a bearing wheel or wheels mounted on a shaft or shafts extending laterally from the tail wheel support stem and traveling over a bearing surface therefor arranged upon the under side of the fuselage, this bearing surface surrounding the support swivel. This arrangement, it will be seen, provides shock absorbing means in the form of pneumatic tires which are arranged to resist the thrust of the swivel upon landing. It will be understood that auxiliary shock absorbing means may also be provided to resist the thrust of the swivel.

Other objects and important features of the invention, to which reference has not specifically been made hereinabove, will appear hereinafter when the following description and claims are considered in connection with the accompanying drawings, in which—

Figure 1 is a perspective view showing the invention embodied in a simple manner in one of the main wheel supports of the landing gear of an airplane;

Figure 2 is a front elevation partly in section of a modified wheel support provided with auxiliary shock absorbing means for the ground-engaging wheel part of the mechanism;

Figure 3 is a view partly in section of a tail wheel and its swiveled support embodying the present invention;

Figure 4 is a view similar to Figure 3 of a modified tail wheel construction having auxiliary shock absorbing means;

Figure 5 is a view of still another tail wheel construction in which the ground-engaging wheel has its bearings carried by cantilever springs connected to the main swiveled support;

Figure 6 is a front elevation partly in section of a modification;

Figure 7 is a section on the line 7—7 of Figure 6; and

Figure 8 is a perspective view showing stabilizing vanes arranged to receive the landing gear.

In the illustrative embodiment of the invention shown in Figure 1 the support for the main wheels of the landing gear comprises a thrust stem 2 for each wheel, which may be the ram of a hydraulic landing gear retracting and projecting mechanism, or it may be a part of the shock-absorbing mechanism of non-retractable landing gear, or it may combine some features of both, the particular function of the thrust stem 2 being immaterial so far as the characteristic features of the present invention are concerned. Ordinarily the thrust stem 2 is not arranged to swivel but is held against turning about its axis so that the main wheels of the landing gear are maintained in parallelism to each other and in parallelism to the longitudinal axis of the plane fuselage.

As shown in Figure 1, the bearing support for the upper and lower wheels 4 and 6 is formed as a fork 8 having arms 10 and 12. The upper wheel 4, which is provided with a pneumatic tire 14, has fixed bearings 16 in the fork; that is, the bearing 16 cannot move in the fork arms 10 and 12 either laterally or longitudinally of said arms. On the other hand, the bearing shaft 18, on which the bearings for the ground-engaging or lower wheel 6 are carried, is movable in slots 20 which extend lengthwise of the arms 10 and 12 of the fork 8 so that the wheel 6 may be moved bodily to cause its tire 22, which is also preferably a pneumatic tire but may, if desired, be a solid or a cushion tire, into compressive engagement with the tire 14 of the upper wheel 4.

For convenience in removing the lower or ground-engaging wheel 6, which naturally is subjected to the greater wear, the lower ends of the arms 10 and 12 are preferably formed in two parts, comprising a movable part 24 hinged at 26 to the stationary part and secured in slot forming relation to the main part of each arm by suitable connecting means such as a machine screw 28. The bearing shaft 16, on which the bearings of the upper wheel 4 are carried, may be held in position by any suitable means such as set screw 30 and may be driven through the fork arms 10 and 12, upon releasing the set screws 30, to remove the upper wheel 4 when repair of this wheel for any reason is necessary.

From the foregoing description it will be seen that the arrangement of the wheels 4 and 6 of the main landing gear mechanism shown is such that, as the plane strikes the ground, the tire 22 of the ground-engaging wheel 6 will first hit the ground and be compressed to some extent but that this compression, with its shock-absorbing function, will not be confined to the tire 22 of the wheel 6, since the landing stress will be transmitted to the tire 14 of the wheel 4 by the bodily movement of the bearing shaft 18 of the wheel 6, together with the wheel, upward in the fork 8, the shaft 18 traveling in the slots 20 in the fork arms 10 and 12. Thus the compression due to the landing stress will be distributed between the two tires 22 and 14 and the turning of the wheel 6 will be transmitted frictionally through the tires 22 and 14 to the wheel 4. By reason of the slight eccentricity produced by the landing stress, the wheels will not turn as freely as they otherwise might and thus they will exert some braking action on the plane.

As hereinabove suggested, in addition to the shock-absorbing action of the tires 22 and 14, supplemental or auxiliary shock absorbing means, such as sometimes employed, may be associated with the wheel supports. In Figure 2 is shown a fork in which auxiliary shock absorbing means resist the movement of the lower wheels 6 upwardly in the fork into engagement with the upper wheel 4, that is, to cause their tires to engage. In the form of the invention shown in Figure 2, the bearing shaft 18 for the lower wheel 6, instead of being arranged to travel in slots in the fork arms 10 and 12, is carried by the male members 32 and 34 of the telescoping fork arms. The female members 36 and 38 of the telescoping fork arms, as shown in Figure 2, have partitions or septa 40 therein and each is provided with packing 42 about the male member, held in position by a gland 44, to form a stuffing box so that a dashpot action is obtained, in addition to the resistance to movement of the male members brought about by the compression spring 46, confined between a shoulder 48 on each male member and the partition 40. A reduced extension 50 on each male member serves to center the springs 46.

The spring 46 is so dimensioned and tensioned that each male member 32 and 34 is projected sufficiently from its associated female member so that the tires 22 and 14 of the wheels 6 and 4 are held slightly separated in flight and remain separated until they are forced into engagement with each other by the stress brought about by the landing operation. When the tread of the tire 22 of the wheel 6 is brought into engagement with the ground it will be apparent that the movement of the tire 22 into engagement with the tire 14 will be resisted by the springs 46 and that the shock will also be partly taken up by the dash pot action hereinabove described.

In the form of the invention illustrated in Figure 3, which shows the invention embodied in the tail wheel part of an airplane landing gear, the tail wheel 52, having a pneumatic tire 54, is shown as mounted in a forked support 56 having a combined swivel and thrust stem 58 swiveled in a bearing 60 which has a flanged horizontal face 62 serving as a bearing surface for pneumatic-tired wheels 64 and 66. The wheels 64 and 66 have their bearings on stub shafts 68 and 70 carried by the swivel stem 58 and extending therefrom, at right angles thereto, in opposite directions. The forked part 56 of the support for the wheel 52 is shown as curved away from the axis of the swivel 58 so that the wheel 52 will caster with the movement of the plane after landing. As the wheel 52 casters about the axis of the swivel 58 it will be apparent that the stub shafts 68 and 70 will cause the wheels 64 and 66 to travel over the bearing surface 62. It will also be apparent that a part of the landing shock will be taken up by the pneumatic tires of these small wheels traveling over the bearing surface 62 and thus the landing strain will be distributed among the three pneumatic tires.

In the form of the invention shown in Figure 4 in which castering of the wheel 52 is permitted by providing a fork 72 coaxial with the swivel 74 and providing an inclined bearing for the swivel 74 in a bracket 76 and bushing 78, the bracket 76 provides a bearing surface for the wheels 64 and 66, and auxiliary shock absorbing means, in the form of a spring 80, are arranged between the brackets 76 and the fixed collar 82 which carries the stub shafts 68 and 70.

In the form of the invention shown in Figure 5, the tail wheel 52 is shown as having its bearings in a member 84 secured by straps 86 to the free end of a cantilever spring 88 fastened in any suitable manner to the flanged lower end of the swivel 90. In this form of the invention only a single stub shaft 92 is shown, on which is mounted a single pneumatic-tired wheel 94, the stub shaft 92 projecting in the same direction from the swivel axis as does the cantilever spring 88, thus being in position to sustain the swivel against lateral strain while absorbing also some of the shock of landing.

Although the wheel 4 is shown as extending outside the plane fuselage when the landing gear is in operative position it will be understood that the invention is not restricted to such arrangement and that more or less of this second wheel may normally be enclosed within the fuselage since its projection therefrom is not necessary to its operation.

In Figures 6 and 7 of the drawings is shown a modification of the invention having two purposes: First, further to do away with excessive shock and strain on the ground-engaging wheels of the landing gear, when landing, by effecting a prerotation thereof and, secondly, to utilize the prerotating means also as means for applying a braking action to the landing gear wheels after ground contact has been effected. It will be understood that these last mentioned two features of the invention, although herein shown in landing gear having upper and lower wheels, are equally applicable to ordinary landing gears.

As herein shown, each of the wheels 4 and 6 of the landing gear, instead of being mounted on bearings-supporting, non-rotatable shafts, as shown in Figure 1, is provided with a driving shaft connected thereto, the wheel 4 being provided with a driving shaft 96, supported in any suitable bearings, and the wheel 6 being provided with a driving shaft 98, also supported in suitable bearings, so that suitable driving motors may be connected to these shafts to effect prerotation of the wheels at the time of landing. As herein shown, advantage is taken of the usual provision of hydraulic pressure-producing means in present-day airplanes to effect the prerotation of the wheels 4 and 6 by means of suitable hydraulic motors 100 and 102, connected to the shafts 96 and 98. Fluid under hydraulic pressure may be supplied to the motor 100 through a flexible armored hose 104, connected at one end to the intake 106 of the motor 100 and at its other end to any suitable source of fluid under hydraulic pressure, not herein shown. Fluid under hydraulic pressure may also be supplied to the second motor 102 in any suitable manner. As herein shown, the exhaust 108 of the motor 100 is connected by a flexible armored hose 110 to the intake 112 of the motor 102. The fluid exhaust from the motor 102 through the exhaust port 114 is returned to the reservoir for the fluid through any suitable return connection such as the armored hose 116.

Any standard valve mechanism for controlling input of hydraulic fluid into the motors 100 and 102 and for relieving excessive back pressure may be provided, such mechanism being well known and available upon the market.

When the plane is about to land and the landing gear has been brought down into operative position, the valves controlling the operation of the motors 100 and 102 may be manipulated to bring these motors into operation to effect prerotation of the wheels 4 and 6 to insure that they will be rotating at a speed corresponding substantially to the speed of rotation that would be imparted to them by the drag of the plane upon landing. After ground contact has been made, the motors 100 and 102 may be utilized as hydraulic brakes by so controlling the flow of the liquid therethrough as to resist the tendency of the wheels 4 and 6 to be rotated at the speed that would normally be imparted thereto by the drag of the plane. In this manner the forward speed of the plane can be gradually reduced and the usual braking mechanism may thus be replaced by the prerotation motors, thus providing prerotation with only a slight increase in the overall weight.

Although the landing gear wheels of the present invention may be swung into and out of their compartments in the plane wings in the same manner as with the ordinary landing gear and, although the space required to receive them is not much greater than with the ordinary gear, it may sometimes be advantageous to arrange the landing gear of the present invention so that the upper wheel is partly or wholly withdrawn into its wing compartment when in operative position. This may be effected, as shown in Figure 8, by providing on the airplane wings stabilizing vanes 118 and 120 of such dimensions as to permit the provision therein of recesses into which the wheels of the landing gear may be retracted. These stabilizing vanes 118 and 120, when suitably designed in respect to the aerodynamic characteristics of the plane as a whole, may serve to enhance the stability of the plane in flight.

What I claim as new is:

1. In landing gear for airplanes, a wheel support including a longitudinally movable thrust stem, an upper pneumatic tired wheel having fixed bearings on said stem-carried support, a lower ground-engaging wheel also having bearings on said stem-carried support and stop means interposed in the path of movement of said upper wheel with said thrust stem whereby the stress longitudinally of said thrust stem which is incident to landing produces a compressive stress on the pneumatic tire of said upper wheel.

2. Landing gear according to claim 1 in which the upper pneumatic-tired wheel is located between said ground-engaging wheel and an associated airplane fuselage in line with and in position to resist inward movements of said thrust stem.

3. Landing gear according to claim 1, in which the thrust stem is also a caster stem for the wheel support and in which a bearing for the upper pneumatic-tired wheel carries said wheel at one side of the axis of said thrust stem to provide bracing for the wheel support against lateral strains transmitted from the ground-engaging wheel.

4. Landing gear according to claim 1, in which two upper pneumatic-tired wheels have their bearings on said support located on opposite sides thereof, between said ground-engaging wheel and an associated airplane fuselage whereby both resist inward movements of said thrust stem and brace said stem against lateral strain imparted thereto from the ground wheel.

5. Landing gear according to claim 3 in which the caster stem is constituted by a cantilever spring.

WILFRED THOMAS.

REFERENCES CITED

The following references are of record in the file of this patent:

UNITED STATES PATENTS

| Number | Name | Date |
|---|---|---|
| 155,763 | Sheldon | Oct. 6, 1874 |
| 438,422 | Pederson | Oct. 14, 1890 |
| 858,348 | Owens | June 25, 1907 |
| 1,037,657 | Petrucci | Sept. 3, 1912 |
| 1,418,008 | Martin | May 30, 1922 |
| 1,436,373 | Walk | Nov. 21, 1922 |
| 1,653,361 | Krammer | Dec. 20, 1927 |
| 2,338,046 | Lloyd | Dec. 28, 1943 |
| 2,381,842 | Schwend | Aug. 7, 1945 |

FOREIGN PATENTS

| Number | Country | Date |
|---|---|---|
| 726,550 | France | Mar. 7, 1932 |